(12) United States Patent
Paul et al.

(10) Patent No.: US 8,999,449 B2
(45) Date of Patent: Apr. 7, 2015

(54) COMPOSITE POLYAMIDE MEMBRANE DERIVED FROM AROMATIC MONOMER INCLUDING ANHYDRIDE AND SULFONYL HALIDE FUNCTIONAL GROUPS

(71) Applicant: Dow Global Technologies LLC, Midland, MI (US)

(72) Inventors: Mou Paul, Edina, MN (US); Tina L. Arrowood, Elko New Market, MN (US); Duane R. Romer, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/197,866

(22) Filed: Mar. 5, 2014

(65) Prior Publication Data

US 2014/0295078 A1   Oct. 2, 2014

Related U.S. Application Data

(60) Provisional application No. 61/805,615, filed on Mar. 27, 2013.

(51) Int. Cl.
  *B05D 1/34* (2006.01)
  *B05D 1/36* (2006.01)
  *B01D 71/56* (2006.01)
  *B01D 69/12* (2006.01)
  *B05D 3/10* (2006.01)

(52) U.S. Cl.
  CPC .............. *B01D 71/56* (2013.01); *B01D 69/125* (2013.01); *B05D 1/36* (2013.01); *B05D 3/107* (2013.01); *B05D 1/34* (2013.01)

(58) Field of Classification Search
  None
  See application file for complete search history.

(56) References Cited

U.S. PATENT DOCUMENTS

| | | |
|---|---|---|
| 4,277,344 A | 7/1981 | Cadotte |
| 4,606,943 A | 8/1986 | Rak et al. |
| 6,024,873 A | 2/2000 | Hirose et al. |
| 6,368,507 B1 * | 4/2002 | Koo et al. ............... 210/500.38 |
| 6,406,626 B1 | 6/2002 | Murakami et al. |
| 6,783,711 B2 | 8/2004 | Kurth et al. |
| 6,878,278 B2 | 4/2005 | Mickols |
| 8,092,918 B2 | 1/2012 | Kurth et al. |
| 2001/0050252 A1 * | 12/2001 | Mickols ........................ 210/490 |
| 2002/0113008 A1 * | 8/2002 | Mickols ................... 210/500.38 |
| 2003/0116498 A1 * | 6/2003 | Mickols ........................ 210/483 |
| 2011/0049055 A1 | 3/2011 | Wang et al. |
| 2014/0199483 A1 * | 7/2014 | Roy et al. ..................... 427/244 |

FOREIGN PATENT DOCUMENTS

| | | |
|---|---|---|
| WO | 2012102942 | 8/2012 |
| WO | 2012102943 | 8/2012 |
| WO | 2013032586 | 3/2013 |

OTHER PUBLICATIONS

M.J. Hurndall, R.D. Sanderson, E.P. Jacobs, A.J. Van Reenen. Poly(2-vinylimidazoline) Composite Reverse Osmosis Membranes. Elsevier Science Publishers B.V., Amesterdam. Desalination, 90(1993) 41-54.

* cited by examiner

*Primary Examiner* — Erma Cameron
(74) *Attorney, Agent, or Firm* — Edward W. Black

(57) ABSTRACT

A method for making a composite polyamide membrane including the step of applying a polyfunctional amine monomer and polyfunctional acyl halide monomer to a surface of the porous support and interfacially polymerizing the monomers to form a thin film polyamide layer, wherein the method is characterized by: i) conducting the interfacial polymerization in the presence of an aromatic anhydride monomer include at least one sulfonyl halide functional group, or ii) applying the aromatic anhydride monomer to the thin film polyamide layer.

8 Claims, No Drawings

COMPOSITE POLYAMIDE MEMBRANE DERIVED FROM AROMATIC MONOMER INCLUDING ANHYDRIDE AND SULFONYL HALIDE FUNCTIONAL GROUPS

FIELD

The present invention is directed toward composite polyamide membranes.

INTRODUCTION

Thin film composite (TFC) membranes are used in a variety of fluid separations. The thin film layer may be formed by interfacial polycondensation reaction between polyfunctional amine (e.g. m-phenylenediamine) and poly-functional acyl halide (e.g. trimesoyl chloride) monomers which are sequentially coated upon the support from immiscible solutions, see U.S. Pat. No. 4,277,344. Various constituents may be added to one or both of the coating solutions to improve membrane performance. For example, U.S. Pat. Nos. 4,606,943 and 6,406,626 describe the formation of a thin film polyamide using a polyfunctional amine and polyfunctional acyl halide along with a polyfunctional acid anhydride halide (e.g. trimelletic anhydride acyl chloride). Similarly, WO 2012/102942 and WO 2012/102943 describe the addition of an aromatic anhydride monomer including a carboxylic acid functional group; and WO 2013/032586 describes the addition of an aromatic anhydride monomer including a phosphonic acid moiety. U.S. Pat. No. 6,878,278 describes the addition of a wide range of complexing agents to the acyl halide coating solution, including various phosphorous containing species. US 2011/0049055 describes the addition of moieties derived from sulfonyl, sulfinyl, sulfenyl, sulfuryl, phosphoryl, phosphonyl, phosphinyl, thiophosphoryl, thiophosphonyl and carbonyl halides. U.S. Pat. No. 6,024,873 describes the addition of selected alcohols, ethers, ketones, esters, halogenated hydrocarbons, nitrogen-containing compounds and sulfur-containing compounds.

U.S. Pat. Nos. 6,783,711 and 8,092,918 describe the preparation of composite polymer sulfonamide membranes formed by interfacially polymerizing a polyfunctional amine monomer with an aromatic sulfonyl halide monomer. See also Hurndall et al, "Poly(2-vinylimidazoline) Composite Reverse Osmosis Membranes," Desalination, 90 (1993) pg 41-54.

The search continues for new additives that further improve membrane performance.

SUMMARY

The invention includes a method for making a composite polyamide membrane comprising the step of applying polyfunctional amine and acyl halide monomers to a surface of a porous support and interfacially polymerizing the monomers to form a thin film polyamide layer. The method further includes at least one of the following steps: i) conducting the interfacial polymerization in the presence of an aromatic anhydride monomer including at least one sulfonyl halide functional group, or ii) applying the aromatic anhydride monomer to the thin film polyamide layer. The invention includes many additional embodiments.

DETAILED DESCRIPTION

The invention is not particularly limited to a specific type, construction or shape of composite membrane or application. For example, the present invention is applicable to flat sheet, tubular and hollow fiber polyamide membranes useful in a variety of applications including forward osmosis (FO), reverse osmosis (RO), nano filtration (NF), ultra filtration (UF) and micro filtration (MF) fluid separations. However, the invention is particularly useful for membranes designed for RO and NF separations. RO composite membranes are relatively impermeable to virtually all dissolved salts and typically reject more than about 95% of salts having monovalent ions such as sodium chloride. RO composite membranes also typically reject more than about 95% of inorganic molecules as well as organic molecules with molecular weights greater than approximately 100 Daltons. NF composite membranes are more permeable than RO composite membranes and typically reject less than about 95% of salts having monovalent ions while rejecting more than about 50% (and often more than 90%) of salts having divalent ions—depending upon the species of divalent ion. NF composite membranes also typically reject particles in the nanometer range as well as organic molecules having molecular weights greater than approximately 200 to 500 Daltons.

Examples of composite polyamide membranes include FilmTec Corporation FT-30™ type membranes, i.e. a flat sheet composite membrane comprising a bottom layer (back side) of a nonwoven backing web (e.g. PET scrim), a middle layer of a porous support having a typical thickness of about 25-125 µm and top layer (front side) comprising a thin film polyamide layer having a thickness typically less than about 1 micron, e.g. from 0.01 micron to 1 micron but more commonly from about 0.01 to 0.1 µm. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 µm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For RO and NF applications, the porous support provides strength but offers little resistance to fluid flow due to its relatively high porosity.

Due to its relative thinness, the polyamide layer is often described in terms of its coating coverage or loading upon the porous support, e.g. from about 2 to 5000 mg of polyamide per square meter surface area of porous support and more preferably from about 50 to 500 mg/m$^2$. The polyamide layer is preferably prepared by an interfacial polycondensation reaction between a polyfunctional amine monomer and a polyfunctional acyl halide monomer upon the surface of the porous support as described in U.S. Pat. Nos. 4,277,344 and 6,878,278. More specifically, the polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional acyl halide monomers are most commonly applied to the porous support by way of a coating step from solution, wherein the polyfunctional amine monomer is typically coated from an aqueous-based or polar solution and the polyfunctional acyl halide from an organic-based or non-polar solution. Although the coating steps need not follow a specific order, the polyfunctional amine monomer is preferably first coated on the porous support followed by the polyfunctional acyl halide. Coating can be accomplished by spraying, film coating, rolling, or through the use of a dip tank among other coating techniques. Excess solution may be removed from the support by air knife, dryers, ovens and the like.

The polyfunctional amine monomer comprises at least two primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris (2-diaminoethyl) amine). Examples of preferred polyfunctional amine monomers include primary amines having two or three amino groups, for example, m-phenylene diamine, and secondary aliphatic amines having two amino groups such as piperazine. One preferred polyfunctional amine is m-phenylene diamine (mPD). The polyfunctional amine monomer may be applied to the porous support as a polar solution. The polar solution may contain from about 0.1 to about 20 weight percent and more preferably from about 0.5 to about 6 weight percent polyfunctional amine monomer. Once coated on the porous support, excess solution may be optionally removed.

The polyfunctional acyl halide monomer comprises at least two acyl halide groups and is preferably coated from an organic-based or non-polar solvent although the polyfunctional acyl halide may be delivered from a vapor phase (e.g., for polyfunctional acyl halides having sufficient vapor pressure). The polyfunctional acyl halide is not particularly limited and aromatic or alicyclic polyfunctional acyl halides can be used along with combinations thereof. Non-limiting examples of aromatic polyfunctional acyl halides include: trimesic acyl chloride, terephthalic acyl chloride, isophthalic acyl chloride, biphenyl dicarboxylic acyl chloride, and naphthalene dicarboxylic acid dichloride. Non-limiting examples of alicyclic polyfunctional acyl halides include: cyclopropane tri carboxylic acyl chloride, cyclobutane tetra carboxylic acyl chloride, cyclopentane tri carboxylic acyl chloride, cyclopentane tetra carboxylic acyl chloride, cyclohexane tri carboxylic acyl chloride, tetrahydrofuran tetra carboxylic acyl chloride, cyclopentane dicarboxylic acyl chloride, cyclobutane dicarboxylic acyl chloride, cyclohexane dicarboxylic acyl chloride, and tetrahydrofuran dicarboxylic acyl chloride. One preferred polyfunctional acyl halide is trimesoyl chloride (TMC). The polyfunctional acyl halide may be dissolved in a non-polar solvent in a range from about 0.01 to 10 weight percent, preferably 0.05 to 3 weight percent and may be delivered as part of a continuous coating operation. Suitable solvents are those which are capable of dissolving the polyfunctional acyl halide and which are immiscible with water, e.g. hexane, cyclohexane, heptane and halogenated hydrocarbons such as the FREON series. Preferred solvents include those which pose little threat to the ozone layer and which are sufficiently safe in terms of flashpoints and flammability to undergo routine processing without taking special precautions. A preferred solvent is ISOPAR™ available from Exxon Chemical Company.

One or both of the coating solutions, but more preferably the non-polar solution may include additional materials including co-solvents, phase transfer agents, solubilizing agents and complexing agents wherein individual additives may serve multiple functions. Representative co-solvents include: benzene, toluene, xylene, mesitylene, ethyl benzene—diethylene glycol dimethyl ether, cyclohexanone, ethyl acetate, butyl carbitol™ acetate, methyl laurate and acetone. U.S. Pat. No. 6,878,278 describes the addition of a broad range of representative complexing agents that may combined with the non-polar solution prior to conducting the interfacial polymerization. A class of such complexing agents is represented by Formula (I).

$$\alpha(L_x\beta)_y \qquad \text{Formula (I)}$$

where $\alpha$ is a non-sulfur containing binding core selected from elements falling within: (a) Group IIIA-VIB (i.e., Groups IIIA, IVA, VA, VIA, VIIA, VIIIA, IB, IIB, IIIB, IVB, VB, VIB) and (b) Periods 3-6 (i.e., Periods starting with Na, K, Rb, and Cs) of the conventional IUPAC periodic table. Groups IIIA through VIB of the conventional IUPAC form of the Periodic Table corresponds to: Groups 3-16 of the "new notation" IUPAC Periodic Table and Groups IIIB-VIA of the CAS version of the Periodic Table. In order to avoid any confusion further reference herein will utilize the conventional IUPAC Periodic Table, i.e., Group IIIA corresponds to the column starting with Sc, Y, La, etc, and Group VIB corresponds to the column starting with O, S, Se, Te, Po. Specific examples include: (1) the following metals: aluminum, scandium, titanium, vanadium, chromium, manganese, iron, cobalt, nickel, copper, zinc, gallium, germanium, arsenic, yttrium, zirconium, niobium, molybdenum, technetium, ruthenium, rhodium, palladium, silver, cadmium, indium, tin, antimony, tellurium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth (bismuth is not typically preferred), and polonium; (2) the following semi-conductors: silicon, selenium, and germanium and (3) phosphorous. Particularly preferred binding cores include: Al, Si, P, As, Sb, Se and Te and metals such as: Fe, Cr, Co, Ni, Cu, and Zn. L is an optional chemical linking group, the same or different, selected from linkages such as: carbon containing moieties, e.g., aromatic groups, alkanes, alkenes, —O—, —S—, —N—, —H—, —P—, —O—P—, and —O—P—O—, (each of which may be substituted or unsubstituted). $\beta$ is solubilizing group, the same or different, and includes from 1 to 12 carbon atoms which may be substituted or unsubstituted and which may include internal linking groups as defined by L. Examples include aliphatic and arene groups having 1 to 6 carbon atoms, aromatic groups, heterocyclic groups, and alkyl groups. "x" is an integer from 0 to 1 and "y" is an integer from 1 to 5, preferably from 2 to 4. Although dependent upon the specific solvent(s) and acyl halide species utilized, the following complexing agents are generally useful in the subject invention: tri-phenyl derivatives of phosphorous (e.g., phosphine, phosphate), bismuth, arsenic and antimony;

alkane oxy esters of phosphorous including tributyl and dibutyl phosphite; organo-metallic complexes such as ferrocene and tetraethyl lead and acetylacetonate complexes of iron (II), iron (III), cobalt (III) and Cr (III). A preferred class of such complexing agents is represented by Formula (II).

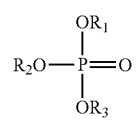

Formula (II)

wherein "P" is phosphorous, "O" is oxygen and $R_1$, $R_2$ and $R_3$ are independently selected from carbon containing moieties. The term "carbon containing moiety" is intended to mean branched and unbranched acyclic groups, e.g., methyl, ethyl, propyl, isopropyl, butyl, isobutyl, pentyl, 2-pentyl, 3-pentyl, tert-butyl, etc., which may be unsubstituted or substituted (e.g., substituted with amide groups, ether groups, ester groups, sulfone groups, carbonyl groups, anhydrides, cyanide, nitrile, isocyanate, urethane, beta-hydroxy ester, double and triple bonds etc.), and cyclic groups, e.g., cyclo pentyl, cyclo hexyl, aromatics, e.g., phenyl, heterocyclic (e.g., pyridine), etc., which may be unsubstituted or substituted, (e.g., substituted with methyl, ethyl, propyl, hydroxyl, amide, ether, sulfone, carbonyl, ester, etc.). Cyclo moieties may be linked to the phosphorous atom by way of an aliphatic linking group, e.g., methyl, ethyl, etc. Preferred carbon containing moieties include unsubstituted, branched or unbranched $C_1$-$C_{12}$ groups, and more preferably $C_1$-$C_8$ aliphatic groups such as: methyl, ethyl, propyl, isopropyl, butyl, 2-methyl butyl, 3-methyl butyl, 2-ethyl butyl, pentyl, hexyl, etc. Additionally, moieties include phenyl groups. When used, the aforementioned complexing agents are preferred added to the organic-based or non-polar coating solution containing the polyfunctional acyl halide in a ratio with the polyfunctional acyl halide monomer of from about 1:5 to 5:1 with 1:1 to 3:1 being preferred. In another preferred embodiment, the concentration of the complexing agent within the coating solutions is from about 0.001 to 2 weight percent.

Once brought into contact with one another, the polyfunctional acyl halide and polyfunctional amine monomers react at their surface interface to form a polyamide layer or film. This layer, often referred to as a polyamide "discriminating layer" or "thin film layer," provides the composite membrane with its principal means for separating solute (e.g. salts) from solvent (e.g. aqueous feed).

The reaction time of the polyfunctional acyl halide and the polyfunctional amine monomer may be less than one second but contact times typically range from about 1 to 60 seconds, after which excess liquid may be optionally removed by way of an air knife, water bath(s), dryer or the like. The removal of the excess solvent can be achieved by drying at elevated temperatures, e.g. from about 40° C. to about 120° C., although air drying at ambient temperatures may be used.

In one embodiment, the method includes the step applying an aromatic anhydride monomer to the thin film polyamide layer (once formed). When applied after the polyamide is formed, the subject monomer is believed to react with residual amine groups present in the thin film polyamide. In an alternative embodiment, the subject aromatic anhydride monomer is present during the interfacial polymerization of the polyfunctional acyl halide and amine monomers. When present during the interfacial polymerization, the subject monomer is believed to be incorporated within the resulting polyamide structure (i.e. the subject monomer and polyfunctional amine and acyl halide monomers form a reaction product).

The subject aromatic anhydride monomer comprises an aromatic moiety preferably comprising 18 or less carbon atoms, e.g. benzene, naphthalene, anthracene, phenanthrene, triphenylene, pyrene, anthraquinone, biphenyl, etc. Other representative aromatic ring structures include heteroarenes such as pyridine, pyrazine, furan and thiadiazole. A benzene ring structure is preferred. The subject aromatic anhydride monomer further comprises an anhydride and at least one sulfonyl chloride functional group. The aromatic moiety may be optionally substituted with non amine-reactive functional groups (e.g. "non reactive" during the time period and conditions present during formation of the thin film polyamide layer) such as: halogen, ketone, nitrile, nitro, sulfone, sulfonyl amides, esters including phosphorous esters, and alkyl and alkenyl groups having from 1 to 12 carbon atoms which may be unsubstituted or substituted with moieties such as halogen, ketone, nitrile and ether groups. A class of preferred monomers is represented by Formula (III).

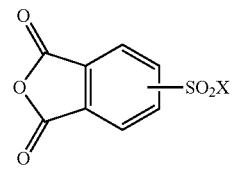

Formula (III)

wherein the sulfonyl halide group may be located at any open position on the aromatic ring, (e.g. positions 2, 3, 4 and 5) and X is a halogen. As mentioned, the monomer may include a plurality of sulfonyl halide groups (e.g. 1 to 4, preferably 1 or 2). A preferred halogen includes chlorine and bromine. A preferred species is 1,3-dioxo-1,3-dihydroisobenzofuran-5-sulfonyl chloride.

As previously described, the step of applying the polyfunctional monomers to the surface of the porous support preferably involves applying a polar solution comprising the polyfunctional amine monomer and a non-polar solution comprising the polyfunctional acyl halide monomer. The step of applying the solutions preferably involves coating by way of spraying, film coating, rolling, or through the use of a dip tank. In one embodiment, the subject aromatic anhydride monomer is added to the non-polar solution prior to the application step, e.g. prior to coating the non-polar solution upon the porous support. In such an embodiment, the non-polar solution preferably comprises at least 0.001 weight/volume of the subject monomer. In another embodiment, the non-polar solution comprises from about 0.001 to 0.1 weight/volume of the subject monomer. In still another embodiment, the non-polar solution comprises the polyfunctional acyl halide and subject aromatic anhydride monomer in a molar ratio of from about 0.001:1 to 0.1:1 and more preferably from 0.001:1 to 0.2:1. The non-polar solution may include additional constituents including the complexing agents described above along with small quantities of water (e.g. from 50 to 500 ppm and in some embodiments at least 100 ppm).

In another embodiment, the subject aromatic anhydride monomer is separately applied to the surface of the porous support (e.g. from a separate solution), either before, during or after the substantial completion of the interfacial polymerization. In this embodiment, the coating solution is preferably a non-polar solution as previously described and preferably comprises a concentration of the subject aromatic anhydride monomer from about 0.5 to 5% weight/volume, or more preferably from about 1 to 3% weight/volume. The solution may include additional constituents including the complexing agents described above along with small quantities of water (e.g. from 50 to 500 ppm and in some embodiments at least 100 ppm).

While not limited to a particular type of polyamide membrane, the subject invention is particularly suited for application to composite membranes such as those commonly used in RO and NF applications, and more particularly to flat sheet composite polyamide membranes used in RO and NF applications. The thin film polyamide layer may optionally include hygroscopic polymers upon at least a portion of its surface. Such polymers include polymeric surfactants, polyacrylic acid, polyvinyl acetate, polyalkylene oxide compounds, poly (oxazoline) compounds, polyacrylamides and related reaction products as generally described in U.S. Pat. Nos. 6,280,853, 7,815,987, 7,882,963, 7,905,361, 7,918,349 and US 2011/0284454. In some embodiments, such polymers may be blended and/or reacted and may be coated or otherwise applied to the polyamide membrane from a common solution, or applied sequentially.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. The entire subject matter of each of the aforementioned US patent documents is incorporated herein by reference.

EXAMPLES

Sample membranes were produced using a pilot scale membrane manufacturing line. Polysulfone supports were casts from 16.5wt. % solutions in dimethylformamide (DMF) and subsequently soaked in a 3.5 wt. % meta-phenylene diamine (mPD) aqueous solution. The resulting support was then pulled through a reaction table at constant speed while a thin, uniform layer of a non-polar solution was applied. The non-polar solution included isoparaffinic (ISOPAR L), trimesoyl acyl chloride (TMC) and in samples 2-4, various amounts of 1,3-dioxo-1,3-dihydroisobenzofuran-5-sulfonyl chloride. The total acyl chloride content of the non-polar solution used to prepare each sample was held constant at 0.24% w/v. The non-polar solution also contained tributyl phosphate in a stoichiometric molar ratio with TMC of approximately 1.3:1. Excess non-polar solution was removed and the resulting composite membrane was passed through water rinse tanks and drying ovens. Coupons of the sample membranes were then subjected to standard pressure testing using an aqueous salt solution (2000 ppm NaCl) at 150 psi, pH 8 and at room temperature. As demonstrated by the results summarized in Table 1 provided below, membranes prepared with the subject sulfonyl chloride monomer exhibited lower salt passage when compared with similar control and comparison membranes.

TABLE 1

| Sample No. | Sulfonyl Chloride Monomer Concentration (g/100 ml) | Mean Flux (GFD) (standard deviation) | Mean NaCl passage (%) (standard deviation) |
| --- | --- | --- | --- |
| 1 | 0 | 42.5 (0.48) | 0.82 (0.02) |
| 2 | 0.01 | 39.1 (0.66) | 0.56 (0.03) |
| 3 | 0.02 | 37.2 (0.59) | 0.55 (0.02) |
| 4 | 0.03 | 33.3 (1.21) | 0.68 (0.05) |
| 5 | 0 | 42.1 (0.88) | 0.91 (0.07) |

The invention claimed is:

1. A method for making a composite polyamide membrane comprising a porous support and a thin film polyamide layer, wherein the method comprises the step of applying a polyfunctional amine monomer and polyfunctional acyl halide monomer to a surface of the porous support and interfacially polymerizing the monomers to form a thin film polyamide layer, and wherein the method is characterized by including at least one of the following steps:

i) conducting the interfacial polymerization in the presence of an aromatic anhydride monomer including at least one sulfonyl halide functional group, or ii) applying said aromatic anhydride monomer to the thin film polyamide layer.

2. The method of claim 1 wherein the step of applying the polyfunctional monomers to the surface of the porous support comprises applying a polar solution comprising the polyfunctional amine monomer and a non-polar solution comprising the polyfunctional acyl halide monomer; and wherein the non-polar solution further comprises said aromatic anhydride monomer.

3. The method of claim 1 wherein the aromatic anhydride monomer includes at least one sulfonyl chloride functional group.

4. The method of claim 1 wherein the aromatic anhydride monomer includes a benzene ring moiety.

5. The method of claim 1 wherein the aromatic anhydride monomer is represented by Formula (III):

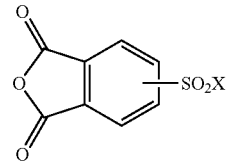

wherein the sulfonyl halide group may be located at any open position on the aromatic ring and X is a halogen.

6. The method of claim 1 wherein the interfacial polymerization is conducted in the presence of a compound represented by Formula (II):

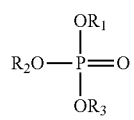

Formula (II)

wherein "P" is phosphorous, "O" is oxygen and $R_1$, $R_2$ and $R_3$ are independently selected from carbon containing moieties.

7. A method for making a composite polyamide membrane comprising a porous support and a thin film polyamide layer, wherein the method comprises the step of applying a polyfunctional amine monomer and polyfunctional acyl halide monomer to a surface of the porous support and interfacially polymerizing the monomers in the presence of a compound represented by Formula (II):

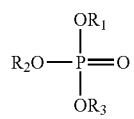

Formula (II)

wherein "P" is phosphorous, "O" is oxygen and $R_1$, $R_2$ and $R_3$ are independently selected from carbon containing moieties to form a thin film polyamide layer, and wherein the method is characterized by including at least one of the following steps:

i) conducting the interfacial polymerization in the presence of an aromatic anhydride monomer including at least one sulfonyl halide functional group, or ii) applying said aromatic anhydride monomer to the thin film polyamide layer.
8. The method of claim 7 wherein the aromatic anhydride monomer is represented by Formula (III):
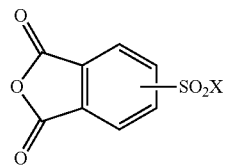
wherein the sulfonyl halide group may be located at any open position on the aromatic ring and X is a halogen.
* * * * *